(12) United States Patent
Wang et al.

(10) Patent No.: US 11,567,256 B2
(45) Date of Patent: Jan. 31, 2023

(54) BACKLIGHT MODULE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Yaodong Wang, Beijing (CN); Yangli Zheng, Beijing (CN); Xiaoping Zhang, Beijing (CN); Jian Ren, Beijing (CN); Site Cai, Beijing (CN); Luo Zhang, Beijing (CN); Qin Xin, Beijing (CN); Zhenguo Zhou, Beijing (CN); Siqi Yin, Beijing (CN); Fangyi Liu, Beijing (CN); Boning Wang, Beijing (CN); Litao Fan, Beijing (CN); Xiaojuan Gao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/479,741

(22) Filed: Sep. 20, 2021

(65) Prior Publication Data
US 2022/0163719 A1 May 26, 2022

(30) Foreign Application Priority Data
Nov. 26, 2020 (CN) .......................... 202022787008.0

(51) Int. Cl.
*F21V 8/00* (2006.01)

(52) U.S. Cl.
CPC ......... *G02B 6/0088* (2013.01); *G02B 6/0051* (2013.01); *G02B 6/0053* (2013.01)

(58) Field of Classification Search
CPC ................................................ G02F 1/133615
See application file for complete search history.

(56) References Cited

U.S. PATENT DOCUMENTS

| | | | |
|---|---|---|---|
| 2012/0002441 A1* | 1/2012 | Yabe ................. | G02F 1/133615 362/607 |
| 2013/0044511 A1* | 2/2013 | Motooka ............. | G02B 6/0051 362/606 |
| 2019/0154908 A1* | 5/2019 | Yabuuchi ............. | G02B 6/0088 |
| 2019/0373715 A1* | 12/2019 | Liu ................... | G02F 1/133615 |
| 2020/0159072 A1* | 5/2020 | Lee ..................... | G02B 6/0051 |

* cited by examiner

*Primary Examiner* — Eric T Eide
(74) *Attorney, Agent, or Firm* — Nath, Goldberg & Meyer; Joshua B. Goldberg (57) ABSTRACT

The present disclosure provides a backlight module and a display device. The backlight module includes: a back plate including a bottom wall and a side wall coupled thereto, with the bottom wall and the side wall defining an accommodating space; a light guide plate disposed in the accommodating space and including: a light outgoing surface disposed away from the bottom wall, a bottom surface disposed toward the bottom wall, and a light incident surface coupled between the light outgoing face and the bottom face; a light source disposed in the accommodating space and configured to emit light toward the light incident surface; and a composite film located on a side of the light guide plate away from the bottom wall and including a diffuser sheet and a plurality of prism sheets combined together and sequentially arranged in a direction away from the light guide plate.

11 Claims, 7 Drawing Sheets

X direction  A-A'

BACKLIGHT MODULE AND DISPLAY DEVICE

CROSS-REFERENCE TO RELATED APPLICATIONS

The present disclosure claims the priority to Chinese Patent Application No. 202022787008.0 filed on Nov. 26, 2020, the entire content of which is hereby incorporated by reference.

TECHNICAL FIELD

The present disclosure relates to the field of display technology, and in particular, to a backlight module and a display device.

BACKGROUND

A backlight module can provide backlight for a liquid crystal panel in a Liquid Crystal Display (LCD) device, so as to enable the liquid crystal panel to display a visual picture viewable by a user. At present, ultra-thin liquid crystal displays having low power consumption are becoming more and more popular, resulting in higher and higher requirements for designs of power consumption and thickness of the liquid crystal displays.

SUMMARY

The present disclosure provides a backlight module, including: a back plate including a bottom wall and a side wall coupled to the bottom wall, with the bottom wall and the side wall defining an accommodating space; a Light Guide Plate (LGP), which is disposed in the accommodating space and includes: a light incident surface, a light outgoing surface and a bottom surface, with the bottom surface disposed toward the bottom wall, the light outgoing surface disposed away from the bottom wall and the light incident surface coupled between the light outgoing surface and the bottom surface; a light source disposed in the accommodating space and configured to emit light toward the light incident surface of the LGP; and a composite film located on a side of the LGP away from the bottom wall and including a diffuser sheet and a plurality of prism sheets, with the diffuser sheet and the plurality of prism sheets combined together and sequentially arranged in a direction away from the LGP.

In some embodiments, the backlight module includes a light emission region corresponding to a display region of a display module, and a non-light emission region around the light emission region. The backlight module further includes a first light shielding layer and a second light shielding layer, and the first light shielding layer is disposed in the non-light emission region of the backlight module and is located on a side of the composite film away from the bottom wall; the composite film includes a first edge portion close to the light source, and an orthographic projection of the first edge portion on the bottom wall is located within an orthographic projection of the first light shielding layer on the bottom wall; and the second light shielding layer includes a first portion located on a side of the light source away from the back plate, and a second portion located between the composite film and the LGP and overlapping with at least a part of the first edge portion in a direction perpendicular to the bottom wall.

In some embodiments, the backlight module further includes a support part located on a side of the first part of the second light shielding layer away from the light source and disposed apart from the composite film.

In some embodiments, a distance between the support part and the composite film ranges from about 0.2 mm to 0.3 mm.

In some embodiments, a surface of the support part away from the light source is lower than or flush with a surface of the composite film away from the LGP.

In some embodiments, the number of the plurality of prism sheets is two, each prism sheet includes a plurality of prism bars, prism bars of a same prism sheet extend along a same direction, and extension directions of prism bars of different prism sheets intersect.

In some embodiments, an orthographic projection of the light source on the bottom wall of the back plate is in a shape of a stripe extending along a first direction, which intersects with the extension direction of prism bars of each prism sheet.

In some embodiments, a thickness of the composite film ranges from about 0.1 mm to 0.12 mm.

In some embodiments, the side wall of the back plate includes a first side wall and a plurality of second side walls, and the first side wall and the plurality of second side walls form a frame. The light source is disposed between the first side wall and the LGP. The backlight module further includes a rubber frame including: a plurality of blocking walls and a bearing part disposed on each blocking wall, the plurality of blocking walls and the plurality of second side walls are arranged side by side in one-to-one correspondence, and the bearing part on each blocking wall is disposed at one end of the corresponding second side wall away from the bottom wall.

In some embodiments, an end of the first side wall away from the bottom wall is bent toward a middle of the accommodating space.

An embodiment of the present disclosure further provides a display device, including a display module, and a backlight module provided by the present disclosure, and the display module is disposed on a light outgoing side of the backlight module.

In some embodiments, an adhesive layer is disposed between the display module and the backlight module and includes a first surface attached to the display module, and a second surface attached to the backlight module, and stickiness of the first surface is smaller than that of the second surface.

BRIEF DESCRIPTION OF THE DRAWINGS

The accompanying drawings are used to provide a further understanding of the present disclosure and constitute a part of the specification. Together with specific embodiments below, the drawings are used to explain the present disclosure, but do not constitute any limitation to the present disclosure. In the drawings.

DETAILED DESCRIPTION

In order to make the objectives, technical solutions and advantages of the embodiments of the present disclosure more apparent, the technical solutions of the embodiments of the present disclosure will be clearly and thoroughly described below with reference to the drawings of the embodiments of the present disclosure. Apparently, the described embodiments are only a part, but not all, of the embodiments of the present disclosure. All other embodiments that are derived by those of ordinary skill in the art without creative efforts belong to the protection scope of the present disclosure.

The terms used herein for describing the embodiments of the present disclosure are not intended to limit the scope of the present disclosure. For example, unless defined otherwise, technical terms or scientific terms used in the present disclosure should have general meanings as understood by those of ordinary skills in the technical field to which the present disclosure belongs. It should be understood that the words "first", "second" and the like used herein are not intended to indicate any order, quantity, or importance, but are used merely to distinguish between different components. Unless otherwise stated, the words "one", "a", "the" and the like do not denote limitation to quantity, but denote "at least one". The words "include", "comprise" and the like indicate that an element or object before the words covers elements or objects or the equivalents thereof listed after the words, but do not exclude other elements or objects. The words "on", "under", "left", "right" and the like are used merely to indicate relative positional relationships, and when an absolute position of an object described is changed, the relative positional relationships may also be changed accordingly.

In the following description, when an element or layer is referred to as being "on" or "coupled to" another element or layer, the element or layer may be directly on or directly coupled to another element or layer, or an intermediate element or an intermediate layer may exist. However, when an element or layer is referred to as being "directly on" or "directly coupled to" another element or layer, there is no intermediate element or intermediate layer. The term "and/or" includes any and all combinations of one or more of associated listed items.

An embodiment of the present disclosure provides a backlight module, which can be applied to a display device to supply backlight to a display module of the display device.

Figure 1:
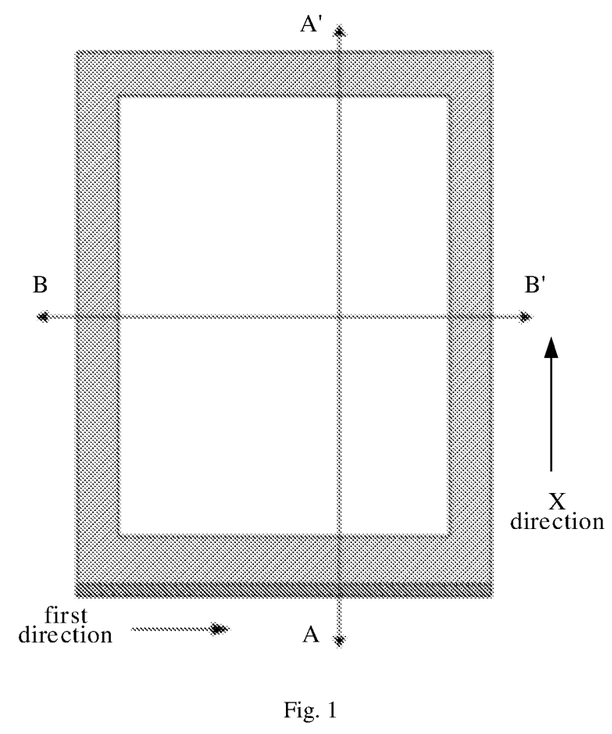
FIG. 1 is a plan view of a backlight module according to an embodiment of the present disclosure.
Figure 2:
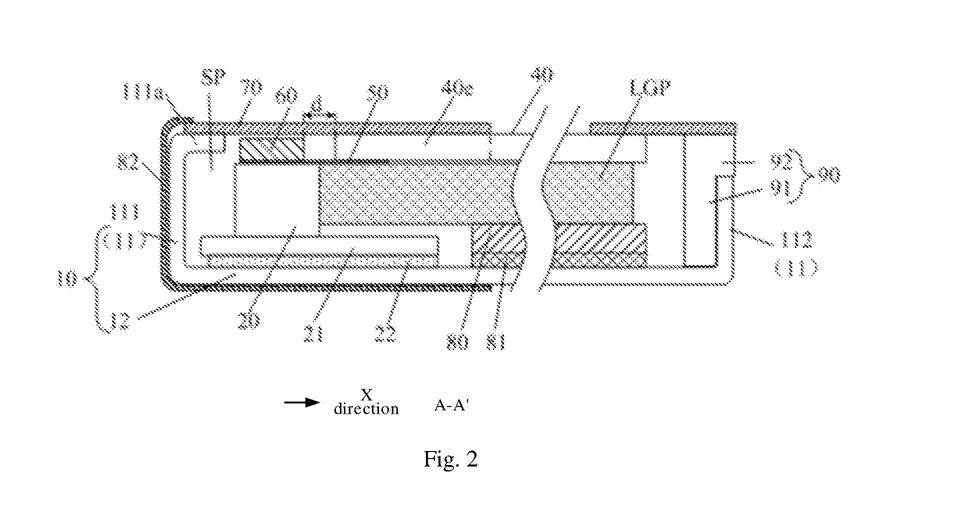
FIG. 2 is a sectional view taken along Line A-A' shown in FIG. 1.
Figure 3:
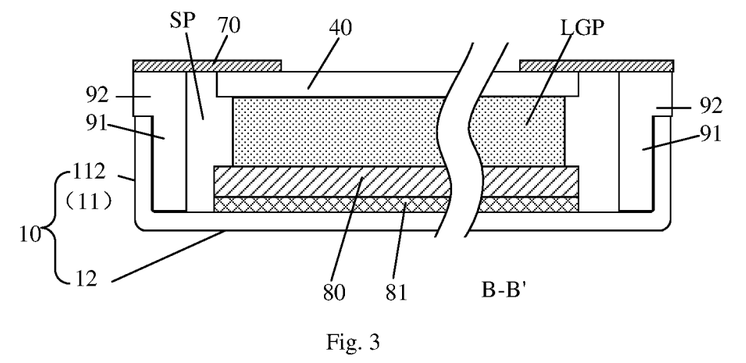
FIG. 3 is a sectional view taken along Line B-B' shown in FIG. 1.

FIG. 1 is a plan view of a backlight module according to an embodiment of the present disclosure, FIG. 2 is a sectional view taken along Line A-A' shown in FIG. 1, and FIG. 3 is a sectional view taken along Line B-B' shown in FIG. 1.

With reference to FIGS. 1 to 3, a backlight module according to an embodiment of the present disclosure includes: a back plate 10, an LGP, a light source 20 and a composite film 40.

The back plate 10 includes a bottom wall 12 and a side wall 11 coupled to the bottom wall 12, and the bottom wall 12 and the side wall 11 define an accommodating space SP.

The LGP is disposed in the accommodating space SP and includes a light incident surface, a light outgoing surface and a bottom surface. The bottom surface of the LGP is disposed toward the bottom wall 12, and the light outgoing surface of the LGP is disposed away from the bottom wall 12, and the light incident surface of the LGP is coupled between the light outgoing surface and the bottom surface. The light entering the LGP through the light incident surface is totally reflected in the LGP and then exits from the LGP through the light outgoing surface.

The light source 20 is disposed in the accommodating space SP and configured to emit light toward the light incident surface of the LGP. For example, the light source 20 may include a Light Emitting Diode (LED), and the LED may be disposed on a light emission driving board 21, which is, for example, a flexible circuit board. The light emission driving board 21 may be fixed on the bottom wall 12 of the back plate 10. For example, the light emission driving board 21 may be attached to the bottom wall 12 of the back plate 10 through an adhesive layer 22. An orthographic projection of the light source 20 on the bottom wall 12 is in the shape of a stripe extending along a first direction (see FIG. 1).

Figure 4:
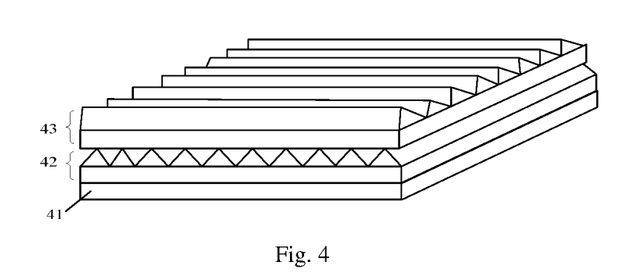
FIG. 4 is a schematic diagram of a composite film according to an embodiment of the present disclosure.

The composite film 40 is located on a side of the LGP away from the bottom wall 12. FIG. 4 is a schematic diagram of a composite film 40 according to an embodiment of the present disclosure. As shown in FIG. 4, the composite film 40 may include a diffuser sheet 41 and a plurality of prism sheets 42 and 43, which are combined together. For example, the number of the prism sheets is two. The prism sheets 42 and 43 are disposed departing from the LGP, that is, the prism sheets 42 and 43 are disposed on a side of the diffuser sheet 41 away from the LGP. The diffuser sheet 41 is configured to diffuse the light which exits from the LGP. The prism sheets 42 and 43 are configured to concentrate the relatively dispersed light which exits from the diffuser sheet 41 into light within a certain angle range for emission, so as to improve the luminance within such range, thereby improving front brightness of a display device.

For example, the prism sheets 42 and 43 and the diffuser sheet 41 are combined together through an adhesive layer between the prism sheets 42 and 43 and an adhesive layer between the prism sheet 42 and the diffuser sheet 41.

Each sheet needs to be set relatively thick in a case where the diffuser sheet 41 and the prism sheets 42 and 43 are independent of one another, otherwise a reliability problem may be easily caused in a manufacturing process of the sheets. In the embodiment of the present disclosure, the prism sheets 42 and 43 and the diffuser sheet 41 are combined into an integral body, so that a thickness of each sheet can be reduced, and a thickness of the composite film 40 is smaller than a total thickness of the composite film in the case where the sheets are disposed independent of one another, which facilities reduction of an overall thickness of the backlight module.

In some embodiments, the composite film 40 may include two prism sheets 42 and 43, each of which may include a plurality of prism bars, the prism bars of a same prism sheet extend along the same direction, and extension directions of the prism bars of different prism sheets intersect. For example, an extension direction of the prism bars of the prism sheet 42 and an extension direction of the prism bars of the prism sheet 43 are perpendicular to each other, so as to improve light utilization of the backlight module to the maximum extent and increase front luminance of the backlight module. In addition, an extension direction of the prism bars of each prism sheet may intersect the first direction (see FIG. 1), so as to prevent the display device from generating stripes during display.

In some embodiments, an overall thickness of the composite film 40 may range from about 0.1 mm to 0.12 mm, such as 0.11 mm.

With reference to FIGS. 2 and 3, the side wall 11 of the back plate 10 includes a first side wall 111 and a plurality of second side walls 112, and the first side wall 111 and the plurality of second side walls 112 form a frame. An end of the first side wall 111 away from the bottom wall 12 is bent toward a middle of the accommodating space SP, that is, forming a bending portion 111a as shown in FIG. 2. The light source 20 is disposed between the first side wall 111 and the LGP. The backlight module further includes a rubber frame 90, which includes a plurality of blocking walls 91 and a bearing part 92 disposed on each blocking wall 91. The plurality of blocking walls 91 and the plurality of second side walls 112 are arranged side by side in one-to-one correspondence, and the bearing part 92 is disposed at one end of the second side wall 112 far away from the bottom wall 12. That is, the plurality of blocking walls 91 of the rubber frame 90 form a semi-closed structure having gaps, and the first side wall 111 is located at the gaps of the semi-closed structure. In this way, a distance between the light source 20 and the side wall 11 of the back plate 10 can be reduced, thereby facilitating the implementation of a narrow border.

The backlight module includes a light emission region and a non-light emission region around the light emission region, and the light emission region of the backlight module corresponds to a display region of a display module. That is, when the backlight module is fixed to the display module, the light emission region of the backlight module is right opposite to the display region of the display module, so that the backlight module can provide backlight for the display region of the display module.

As shown in FIGS. 2 and 3, the backlight module may further include a first light shielding layer 70, a connection layer 82 and a reflective sheet 80. The first light shielding layer 70 is disposed in the non-light emission region of the backlight module and located on a side of the composite film 40 away from the bottom wall 12. For example, the first light shielding layer 70 is fixed on a surface of the bending portion 111a of the first side wall 111 away from the bottom wall 12 and a surface of the rubber frame 90 away from the bottom wall 12. The first light shielding layer 70 may be made of an adhesive material. The connection layer 82 is coupled to the first light shielding layer 70 and the back sheet 10, so as to fix the first light shielding layer 70 to the back sheet 10. The connection layer 82 may be an adhesive layer.

The reflective sheet 80 is located between the LGP and the bottom wall 12 of the back plate 10 and is configured to reflect the light which exits from the LGP through the bottom surface thereof, thereby improving light utilization. The reflective sheet 80 may be fixed on the bottom wall 12 through an adhesive layer for reflective sheet 81.

The composite film 40 includes a first edge portion 40e close to the light source 20, and an orthographic projection of the first edge portion 40e on the bottom wall 12 is located within an orthographic projection of the first light shielding layer 70 on the bottom wall 12.

The backlight module further includes a second light shielding layer 50, which is located in the non-light emission region and does not overlap with the light emission region. The second light shielding layer 50 includes a first portion located on a side of the light source 20 away from the back plate 10, and a second portion located between the composite film 40 and the LGP and overlaps with at least a part of the first edge portion 40e in a direction perpendicular to the bottom wall 12. The second light shielding layer 50 can prevent the light emitted by the light source 20 from directly entering the display region through spaces between the prism bars of the prism sheets. For example, a width of the second portion of the second light shielding layer 50 may be 0.6 mm.

The second light shielding layer 50 may be an adhesive layer directly attached to the light source 20 and the composite film 40.

In order to obtain a backlight module having a smaller thickness, the second light shielding layer 50 may be thinner, for example, a thickness of the second light shielding layer 50 may be 0.01 mm.

In addition, a support part 60 may be provided on a side of the first portion of the second light shielding layer 50 away from the light source 20, and may be attached to the second light shielding layer 50. In a manufacturing process of the backlight module, the support part 60 and the composite film 40 may be made first, and then the second light shielding layer 50 is attached to the support part 60 and the composite film 40, thereby preventing the thinner second light shielding layer 50 from bending.

The support part 60 may be disposed apart from the composite film 40 by a distance, which can prevent the composite film 40 from being pressed by the support part 60 when the support part 60 expands during some thermal performance tests of the backlight module. Optionally, the distance between the support part 60 and the composite film 40 may range from about 0.2 mm to 0.3 mm, for example, the distance is about 0.25 mm.

A width of the support part 60 (i.e., the dimension of the support part 60 in an X direction shown in FIG. 2) may range from about 0.5 mm to 0.7 mm, for example, the width is about 0.6 mm A thickness of the support part 60 may be about 0.1 mm.

Optionally, a surface of the support part 60 away from the light source 20 may be flush with a surface of the composite film 40 away from the LGP, so that the first light shielding layer 70 may be disposed on a relatively flat surface when being attached. Or, the surface of the support part 60 away from the light source 20 may be lower than the surface of the composite film 40 away from the LGP. That is, a distance between the surface of the support part 60 away from the light source 20 and the bottom wall 12 is smaller than or equal to that between the surface of the composite film 40 away from the LGP and the bottom wall 12.

FIGS. 5A to 5J are schematic diagrams illustrating a manufacturing process of the composite film 40, the second light shielding layer 50 and the support part 60 according to an embodiment of the present disclosure.

Figure 5A:
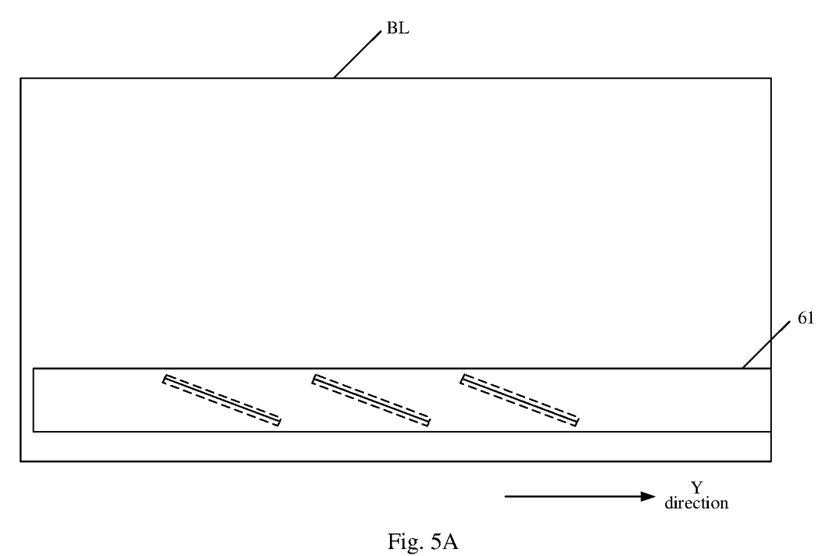
FIGS. 5A to 5J are schematic diagrams illustrating a manufacturing process of a composite film, a second light shielding layer and a support part according to an embodiment of the present disclosure.
Figure 5B:
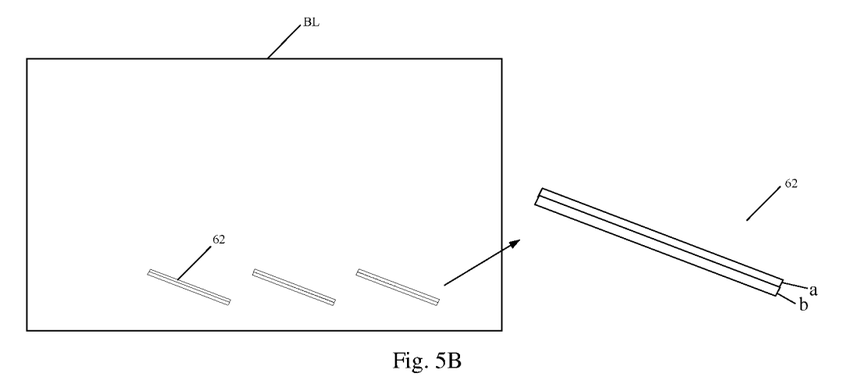

With reference to FIGS. 5A and 5B, a light shielding tape 61 for forming the support part 60 is placed on a base film BL and moved along a Y direction. In a process of moving the light shielding tape 61, the light shielding tape 61 is punched with a cutting knife (e.g., a flat knife or a circular knife) to obtain first support bars 62 (shown in FIG. 5B). Dotted lines in FIG. 5A refer to punching edges, the first support bar 62 is made into a shape as shown in FIG. 5B, and an area a of the first support bar 62 is an area where the support part 60 is to be formed, and an area b is a reserved area.

Figure 5C:
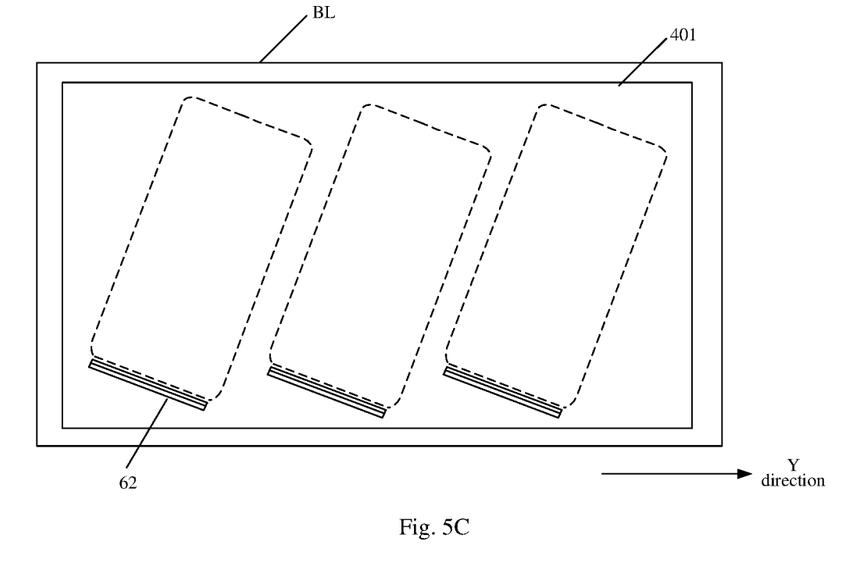
Figure 5D:
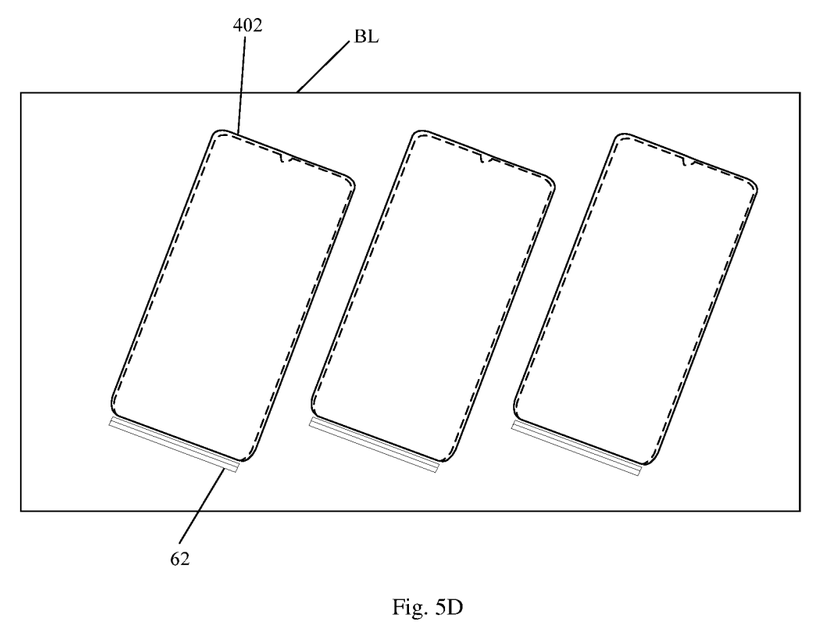
Figure 5E:
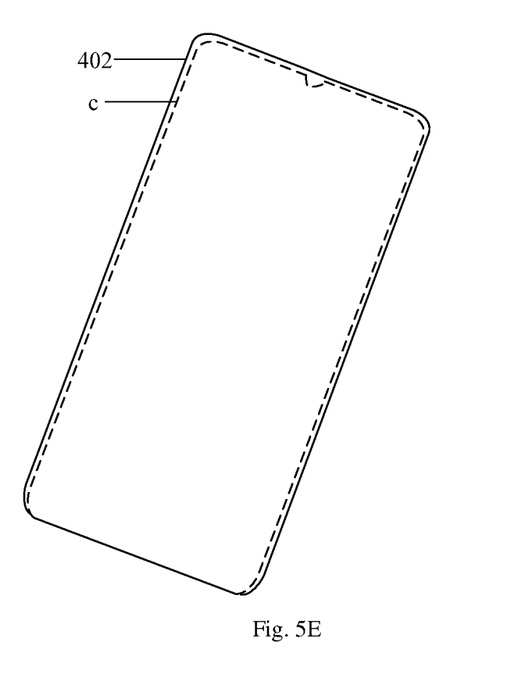

With reference to FIGS. 5C to 5E, a first roll 401 for forming the composite film 40 is placed on the base film BL and moved in the Y direction. The first roll 401 includes a diffuser layer and two prism layers, which are combined together. An extension direction of prism bars of one prism layer of the first roll 401 may be the same as the Y direction, and an extension direction of prism bars of the other prism layer of the first roll 401 may be perpendicular to the Y direction. The first roll 401 is punched to obtain to-be-processed composite films 402 as shown in FIG. 5D, and dotted lines in FIG. 5C refer to punching edges. FIG. 5E is an enlarged view of the to-be-processed composite film 402, and an area c in FIG. 5E is an area where the composite film 40 shown in FIG. 2 is to be formed. An edge of the to-be-processed composite film 402 close to the first support bar 62 is separated from the first support bar 62 by a distance of about 0.25 cm.

Figure 5F:
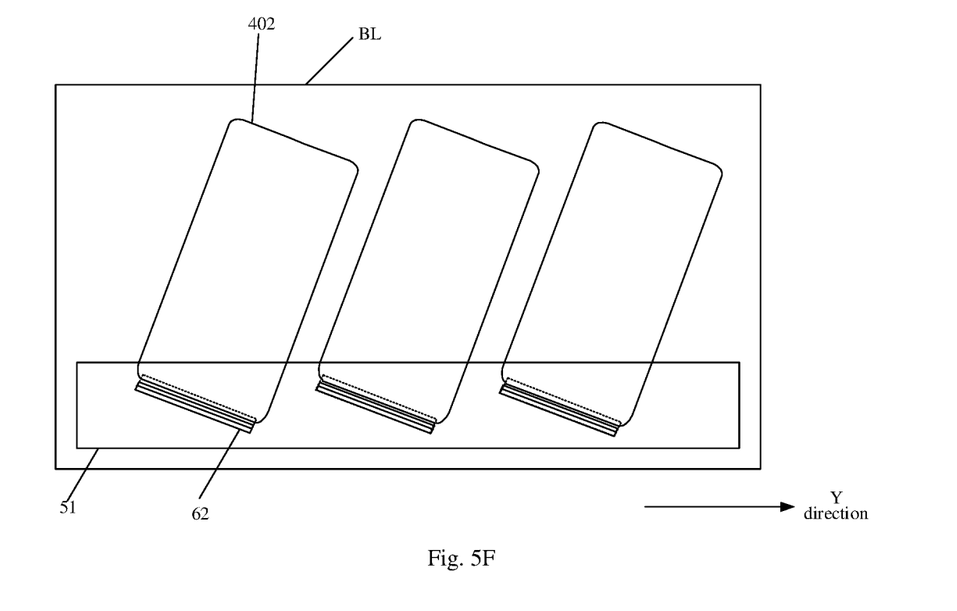
Figure 5G:
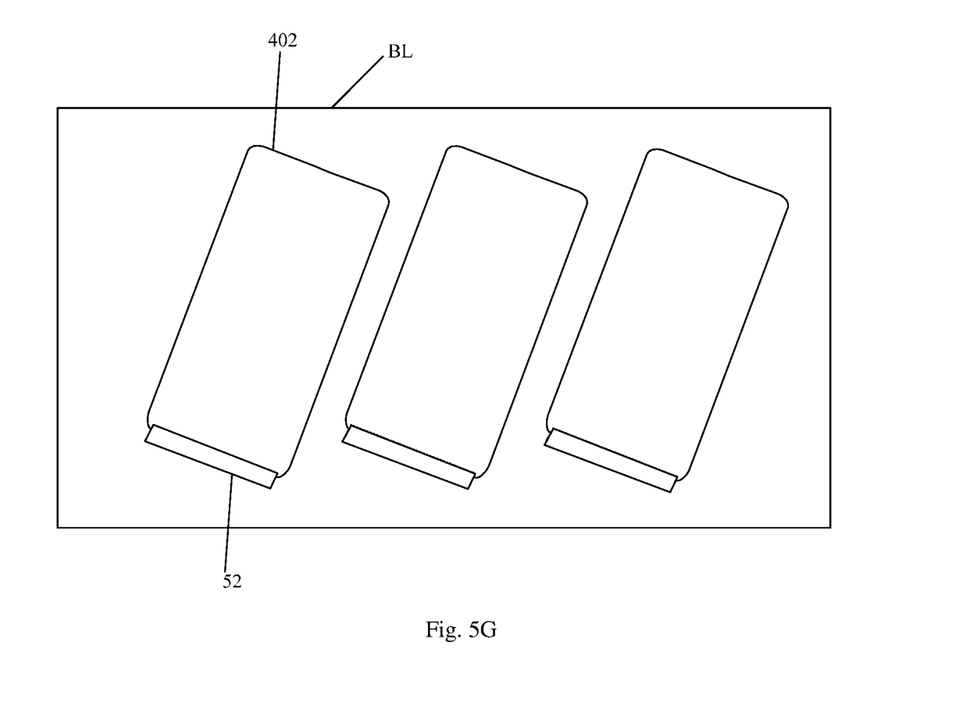

With reference to FIGS. 5F and 5G, a second roll 51 for forming the second light shielding layer 50 is placed on the base film BL and moved in the Y direction. The second roll 51 is attached to the to-be-processed composite films 402 and the first support bars 62. The second roll 51 is punched to obtain to-be-processed light shielding layers 52 shown in FIG. 5G, and dotted lines in FIG. 5F refer to punching edges. A part of the to-be-processed light shielding layer 52 is attached to the to-be-processed composite film 402, and the remaining part of the to-be-processed light shielding layer 52 covers the first support bar 62.

Figure 5H:
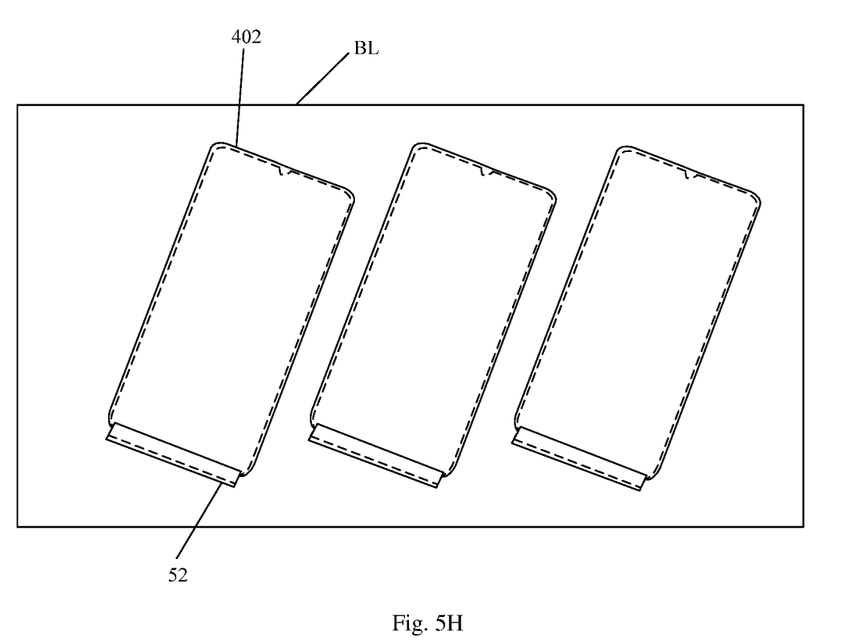
Figure 5I:
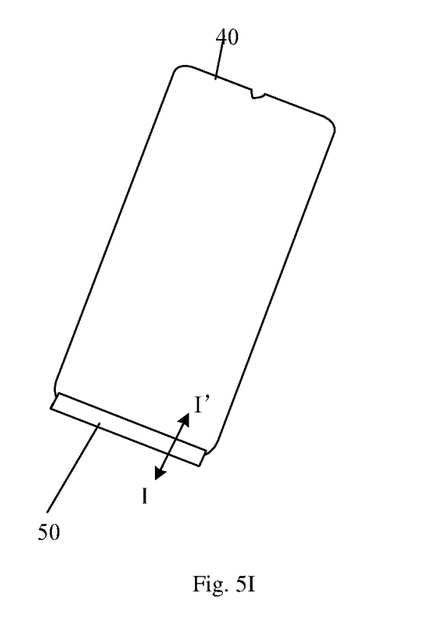
Figure 5J:
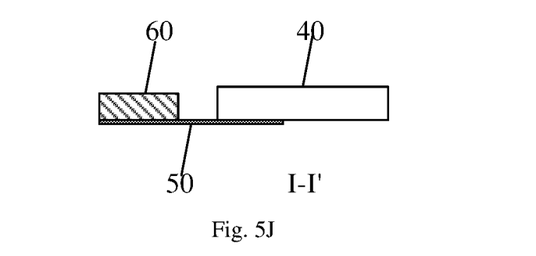

With reference to FIGS. 5H to 5J, the to-be-processed composite films 402 are punched along dotted lines shown in FIG. 5H to finally obtain the composite film 40 shown in FIG. 2; meanwhile, the to-be-processed light shielding layers 52 and the first support bars 62 are cut to remove the reserved areas and the parts of the to-be-processed light shielding layers 52 which cover the reserved areas, so as to finally obtain the support part 60 and the second light shielding layer 50, as shown in FIG. 5I. FIG. 5J is a sectional view taken along Line I-I' shown in FIG. 5I, and the second light shielding layer 50 is attached to both the composite film 40 and the support part 60.

Figure 6:
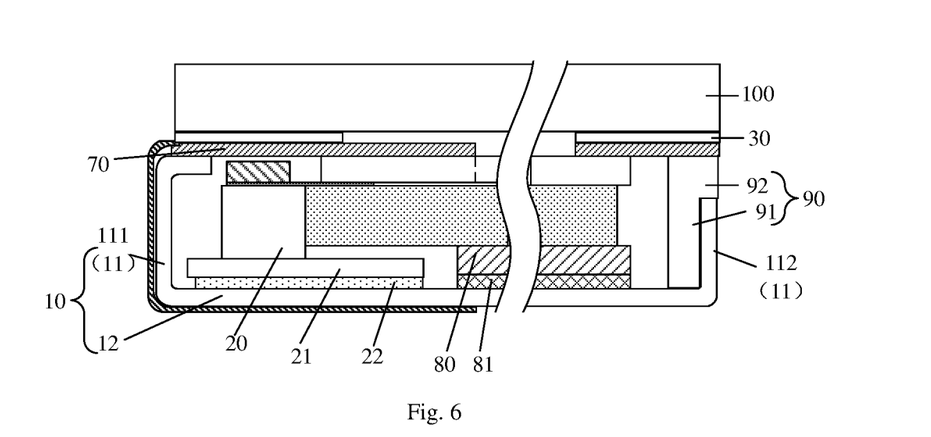
FIG. 6 is a schematic diagram of a display device according to an embodiment of the present disclosure.

An embodiment of the present disclosure further provides a display device, and FIG. 6 is a schematic diagram of a display device according to an embodiment of the present disclosure.

As shown in FIG. 6, the display device may include the backlight module provided by each embodiment of the present disclosure, and a display module 100 disposed on a light outgoing side of the backlight module and fixedly coupled to the backlight module. The display module 100 may include an array substrate, a color filter substrate, a liquid crystal layer disposed therebetween, an upper polarizer and a lower polarizer (not shown).

An adhesive layer 30 is disposed between the display module 100 and the backlight module, and the display module 100 is fixedly attached to the backlight module through the adhesive layer 30. The lower polarizer of the display module 100 may be attached to the adhesive layer 30. The adhesive layer 30 includes a first surface attached to the display module 100, and a second surface attached to the backlight module. A stickiness of the first surface of the adhesive layer 30 is smaller than that of the second surface of the adhesive layer 30, which can reduce a pull on the display module 100 by the adhesive layer 30 in a process of attaching the display module 100 to the backlight module or in a process of moving the display device, and avoid damage to the lower polarizer of the display module 100.

It should be understood that the above embodiments are merely exemplary embodiments adopted to illustrate the principles of the present disclosure, and the present disclosure is not limited thereto. Those of ordinary skill in the art can make various changes and improvements without departing from the spirit and essence of the present disclosure, and those changes and improvements should also be considered to fall within the scope of the present disclosure.

What is claimed is:

1. A backlight module, comprising:
   a back plate comprising a bottom wall and a side wall coupled to the bottom wall, with the bottom wall and the side wall defining an accommodating space;
   a light guide plate, which is disposed in the accommodating space and comprises: a light incident surface, a light outgoing surface and a bottom surface, with the bottom surface disposed toward the bottom wall, the light outgoing surface disposed away from the bottom wall and the light incident surface coupled between the light outgoing surface and the bottom surface;
   a light source disposed in the accommodating space and configured to emit light toward the light incident surface of the light guide plate; and
   a composite film located on a side of the light guide plate away from the bottom wall and comprising a diffuser sheet and a plurality of prism sheets, with the diffuser sheet and the plurality of prism sheets combined together and sequentially arranged in a direction away from the light guide plate,
   wherein the backlight module comprises a light emission region corresponding to a display region of a display module, and a non-light emission region around the light emission region,
   the backlight module further comprises a first light shielding layer and a second light shielding layer, and the first light shielding layer is disposed in the non-light emission region of the backlight module and is located on a side of the composite film away from the bottom wall;
   the composite film comprises a first edge portion close to the light source, and an orthographic projection of the first edge portion on the bottom wall is located within an orthographic projection of the first light shielding layer on the bottom wall; and
   the second light shielding layer comprises a first portion located on a side of the light source away from the back plate, and a second portion located between the composite film and the light guide plate and overlapping with at least a part of the first edge portion in a direction perpendicular to the bottom wall.

2. The backlight module of claim 1, further comprising a support part located on a side of the first part of the second light shielding layer away from the light source and disposed apart from the composite film.

3. The backlight module of claim 2, wherein a distance between the support part and the composite film ranges from 0.2 mm to 0.3 mm.

4. The backlight module of claim 2, wherein a surface of the support part away from the light source is lower than or flush with a surface of the composite film away from the light guide plate.

5. The backlight module of claim 1, wherein the number of the plurality of prism sheets is two, each prism sheet comprises a plurality of prism bars, prism bars of a same prism sheet extend along a same direction, and extension directions of prism bars of different prism sheets intersect.

6. The backlight module of claim 5, wherein an orthographic projection of the light source on the bottom wall of the back plate is in a shape of a stripe extending along a first direction, which intersects with the extension direction of prism bars of each prism sheet.

7. The backlight module of claim 1, wherein a thickness of the composite film ranges from 0.1 mm to 0.12 mm.

8. The backlight module of claim 1, wherein the side wall of the back plate comprises a first side wall and a plurality of second side walls, and the first side wall and the plurality of second side walls form a frame, the light source is disposed between the first side wall and the light guide plate, and the backlight module further comprises a rubber frame comprising: a plurality of blocking walls and a bearing part disposed on each blocking wall, the plurality of blocking walls and the plurality of second side walls are arranged side by side in one-to-one correspondence, and the bearing part on each blocking wall is disposed at one end of the corresponding second side wall away from the bottom wall.

9. The backlight module of claim 8, wherein an end of the first side wall away from the bottom wall is bent toward a middle of the accommodating space.

10. A display device, comprising a display module and the backlight module of claim 1, wherein the display module is disposed on a light outgoing side of the backlight module.

11. The display device of claim 10, wherein an adhesive layer is disposed between the display module and the backlight module, and comprises a first surface attached to the display module, and a second surface attached to the backlight module, and stickiness of the first surface is smaller than that of the second surface.

* * * * *